July 15, 1952 — A. EVERS — 2,603,125
COMBINATION ENLARGER AND PROJECTOR SYSTEM
Filed Aug. 16, 1949 — 2 SHEETS—SHEET 2
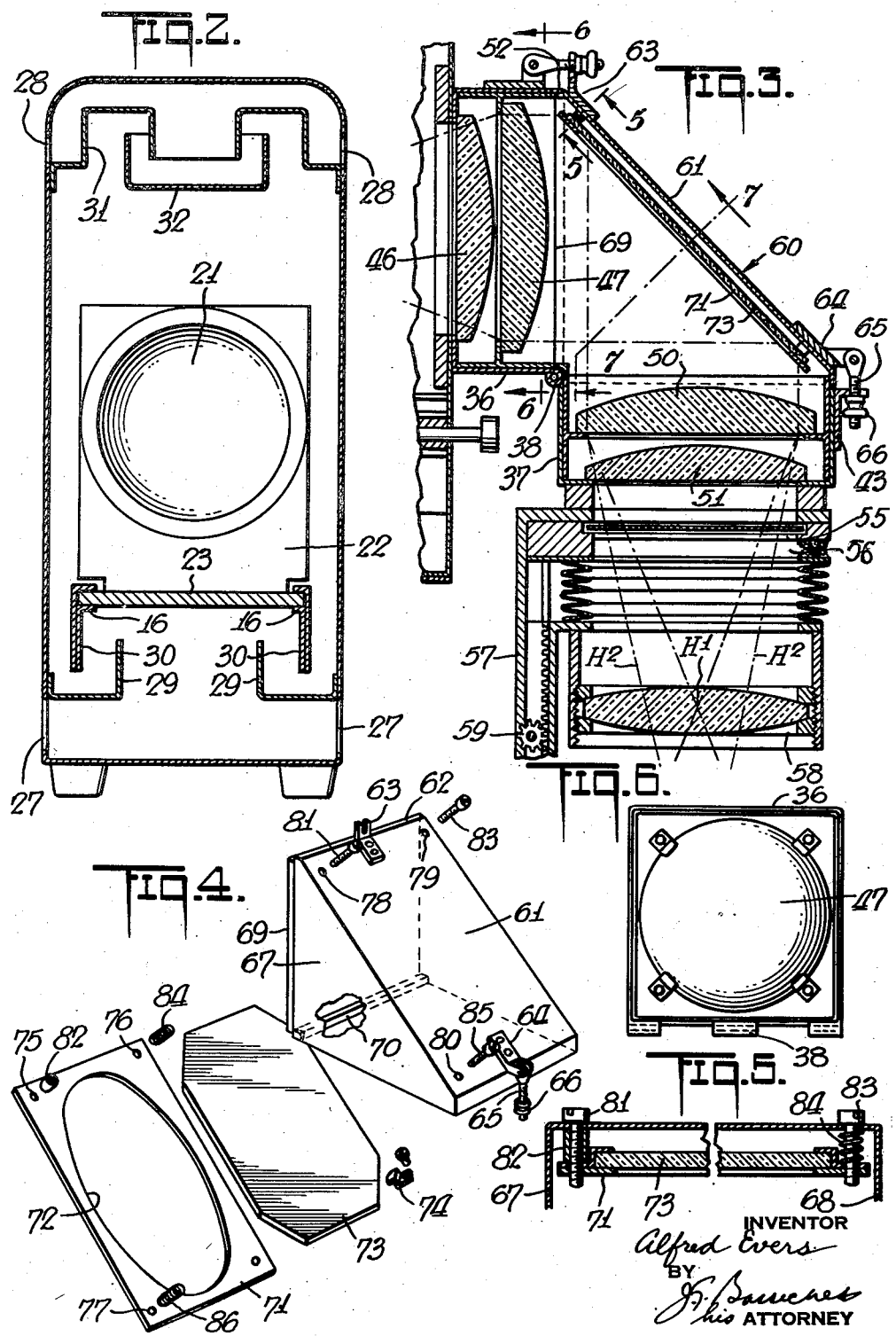

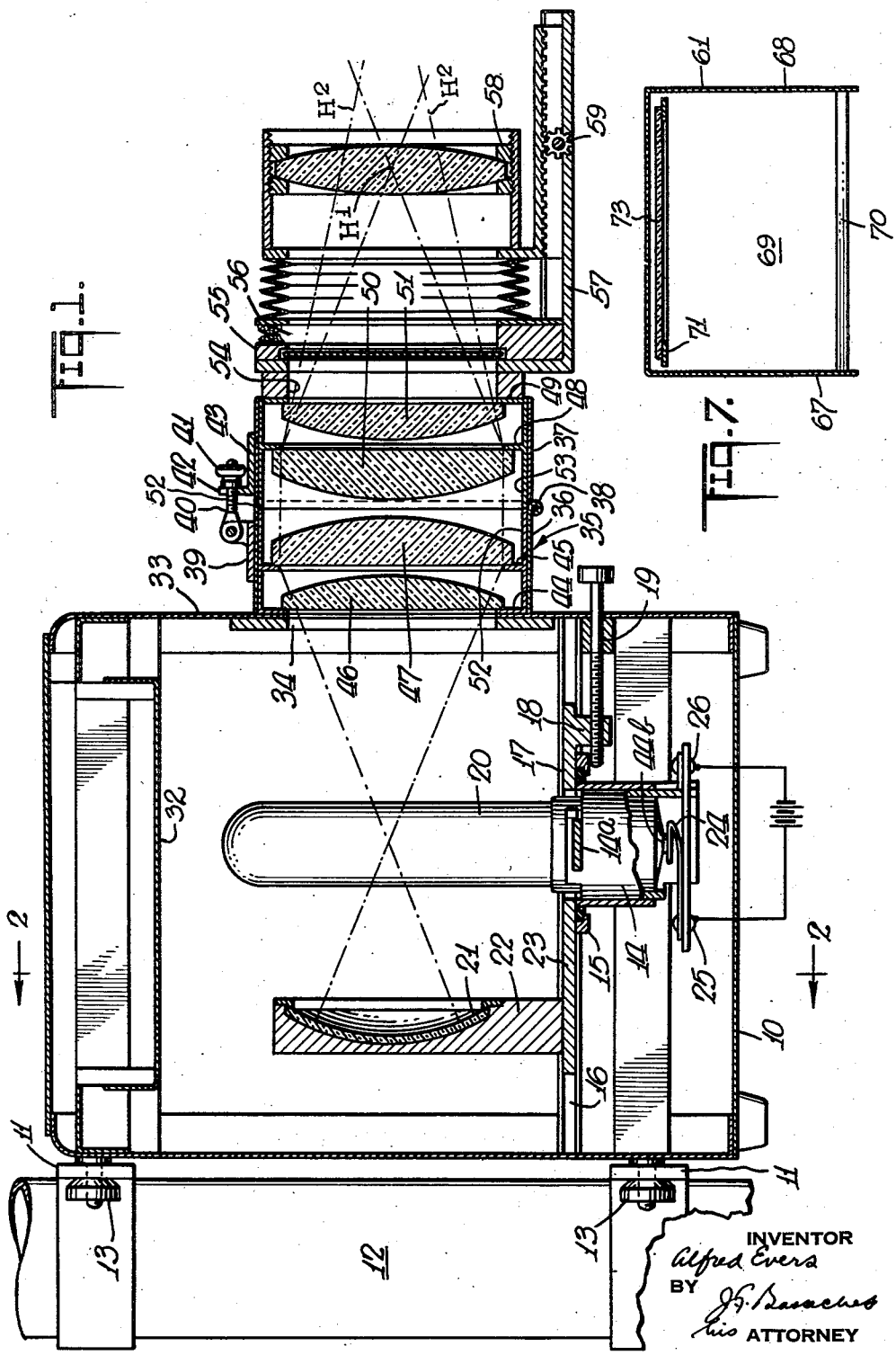

Patented July 15, 1952

2,603,125

UNITED STATES PATENT OFFICE 2,603,125

COMBINATION ENLARGER AND PROJECTOR SYSTEM

Alfred Evers, Augsburg, Bayern, Germany, assignor to Ada Fuegeman, Westchester County, N. Y.

Application August 16, 1949, Serial No. 110,640

6 Claims. (Cl. 88—24)

1

This invention relates to photographic devices and more particularly to a projector system which may serve in the dual capacity of a projector and enlarger.

It is an object of my invention to provide apparatus for use in projecting for the magnification of images either for the projection on a screen or for use in making photographic enlargements.

It is contemplated by my invention and it is an object thereof to provide a light projection optical system in which a single light source assembly, in its most efficient position for projection, is employed to serve the dual purpose for projection from a slide and without altering the relationship of the light source and reflector assembly employing the instrumentality for photographic enlarging purposes by the same lens assembly.

Still more particularly it is an object of my invention to provide a magnifying projection system in which a single light source and reflector assembly is combined with a separable condenser or an accumulator assembly of lenses to convert the direction of the beam of light which is projected, to retain the relative position of the light source optical system while diverting, by reflection, the image projection system, whereby economies are effected so that a single instrument may be employed for projection from slides or for enlargement in photography operations.

Still further it is an object of my invention to provide a low cost, optically correct projector and enlarger while retaining the light source in its most effective projection position.

To attain these objects and such further objects as may appear herein, or be hereinafter pointed out, I make reference to the accompanying drawing, forming a part hereof, in which—

Figure 1 is a longitudinal sectional view of my apparatus for projection purposes;

Figure 2 is a section taken on the line 2—2 of Figure 1;

Figure 3 is a fragmentary sectional view for conversion of the device for enlarging;

Figure 4 is an exploded perspective view of the reflector system;

Figure 5 is a section taken on the line 5—5 of Figure 3;

Figure 6 is a section taken on the line 6—6 of Figure 3;

Figure 7 is a section taken on the line 7—7 of Figure 3.

Making reference to the drawing, I provide a light housing 10 having brackets 11 for attachment to the standard 12 by removable nuts 13. Within the housing there is provided a lamp socket 14 supported on a cross slide 15 having screw fed means for transverse adjustment. Guide slides 16 slidably mount the plate support 17 along the longitudinal axis, a screw-threaded lug 18 being provided for the adjusting screw 19 for longitudinal shifting of the lamp 20 which is held vertically in position in the socket 14.

A condensing mirror 21 is mounted on a standard 22 which is vertically supported on a slidable pedestal 23 which is formed for shifting movement in the support 17, previously described. Adjusting screws (not shown) are provided for initially adjusting the mirror standard with respect to the lamp 20, the adjusting means 19 being employed for bodily longitudinal shifting the reflector and lamp along the optical axis.

The socket 14 has provision for a bayonet slot coupling 14a for engagement to the usual prongs of the lamp 20, to hold the base 44b of the lamp in engagement with the axial contact 24 leading to the terminal 25 and to hold the base in electrical contact with the terminal 26, the terminals 25 and 26 having flexible leads to a source of electrical power for illuminating the lamp in a manner which will be readily understood. The casing is formed with lower vents 27, 27 and upper vents 28, 28 for conducting off the heat of the lamp. Lower shields 29 and 30 and upper shields 31 and 32 form a sinuous path or maze to permit ventilation without escape of stray light.

The front wall of the casing 33 has an emitting aperture 34 over which is aligned the condenser lens casing 35. The casing 35 comprises a square tubing having conforming condenser segments 36 and 37 joined by a hinge 38, rolled from the respective segments. The upper wall portion of the segment 36 carries a bracket 39, pivotally mounting a tensioning screw 40 and knurled nut 41, to ride in the fork 42 of the bracket 43, thereby to draw the segments 36 and 37 into locking engagement about the hinge 38. Ring mounts 44, 45 and appropriate clamps axially center the condenser lenses 46 and 47 in the segment 36, while ring mounts 48 and 49 mount the condenser lenses 50 and 51 in the front segment 37.

Internal coupling rings 52 and 53 telescope in overlapping position to provide a light-tight engagement of the condenser segments.

The condenser casing 35 has a ring coupling 54 for the image stage 55 which is provided with a slider holder 56. The coupling 54 permits of orientation of the oblong slide of film in accordance with the arrangement desired of the wide or narrow dimensions of the film or slide. A slide 57 may adjustably support an objective lens assembly 58 which is adjustable as by the rack and pinion adjustment 59, shown for exemplification only. Other adjusting means may be employed to focus the lens 58, in a manner readily understood.

The assembly shown in Figure 1 is suitable for projection purposes and for projecting upon a screen which is vertically positioned normal to the optical axis of the optical system disclosed.

In accordance with my invention whereby the device may be employed for enlarging, I provide a reflector casing 60, comprising a removable unit, more specifically shown in Figures 3 and 4, and constituting a back plate 61 having at its upper end corner 62 a forked bracket 63 similar to the bracket 43 previously described, with the fork elements thereof complementarily positioned to be engaged by the tensioning screw 40 and turn knob 41. The lower end corner of the back plate 61 is provided with a bracket 64 carrying a tensioning screw 65 and a knurled turn knob 66 for engaging the forked bracket 42 of the lens casing segment 37.

The side walls 67, 68, each merge at the corner to define complemental square connector frames 69 and 70 interfitting with coupling rings 52 and 53 of the segments 36 and 37, respectively. The inner face of the wall 61 carries a frame 71 having an elliptical aperture 72 over which there is held the mirror 73 by clamping clips 74. The frame 71 is formed with screw-threaded holes 75, 76 and 77, complementarily positioned to the drill holes 78, 79 and 80 of the casing back 61. A tensioning screw 81 is directed through the aperture 78, through a spacing sleeve 82, into engagement with the threaded aperture 75. An adjusting screw 83 is directed through the aperture 79, through an expansion spring 84, into the threaded hole 76. An adjusting screw 85 is directed through the hole 80, through an expansion spring 86, then into engagement with the threaded hole 77. The adjusting screws 83 and 85 may be manipulated against the tension of the springs 84 and 86 about the screw 81 and sleeve 82 to tilt the mirror with regard to the optical axis in a vertical and horizontal direction.

From the assembly described, it will be apparent that only a single or permanently positioned source of illumination 20 need be employed and be supported in the erect position, or the best position for preventing sagging of the filament from the optically predetermined position for both projection along optical axis or for enlargement transverse to the optical axis.

For use as a projector, the segments 36 and 37 are coupled to each other directly as illustrated in Figure 1 to have the lenses of the condenser system transverse to the optical axis of the source of illustration and the reflector 21.

Initially the socket 14 is moved by its adjusting system along the guides 15 and 16 until the image of the filament is apparent in the center of the objective. The mechanism is then tightened to set or fix the position of the socket as this position will remain fixed with the bulb in question, and will require no re-adjustment until a new light source is substituted.

Thereafter, for enlarging purposes, the tension screw 40 is disengaged from the bracket 42 and the segment 37 is swung at right angles to the segment 36, as more clearly shown in Figure 3, whereupon the angular mirror reflector unit is interposed between the segments, coupling and tensioning the screws 40 and 65, respectively. The adjusting screws 83 and 85 are manipulated to dispose the image of the filament of the light source in the center of the objective 58. This thereby provides a fixed adjustment. It is to be understood that the pencil of light may be adjusted through the optical system to form an image of the light source at a focal point HI within the objective 58, which is the plane of the diaphragm. The focal point HI (respectively H2) can be changed by a shifting of the light source 20 together with its mirror 21 in the direction of the optical axis as to adapt it to the focal length of the objective just in use. Upon removal of the condenser lens 51, the pencil may be conveyed at another focus indicated by the convergence outline H2, if an objective with a great focal length or generally a great distance of the objective from the slide is needed in case of enlargment. Upon removal of the condenser lenses 50 and 51, the pencil of rays may be converged at a secondary focus indicated by the convergence outline H2, so that the enlargement can be adjusted to an objective with a great focal distance.

It will be observed also that the original divergent rays which have been converted to parallel rays or at least to approximately parallel rays between the condenser lenses 47 and 50 continue this way when the mirror 71 is interposed. It may be possible to omit the condenser lenses 47 and 50 with the mirror in position as will readily occur to those appreciating the optical premises involved and the refractive characteristics of the condenser lenses which may be chosen and for this purpose the lens mounts are removable. Provision for adjustment of the light source and reflector in the direction of the optical axis by the means described will permit adjustment for obtaining the optimum quality of magnification and homogeneity of brightness of the projected picture. This adjustment will be appreciated since the distance of the image for projection and enlargement is not the same in the two positions which the objective lenses may assume.

In view of the fact that the light changes its direction before it impinges upon the picture in the slide, a relatively inexpensive mirror may be employed requiring no optically perfect and high cost mirror reflector.

One light source may be employed, overcoming any error involved in changing from one light source to another.

It will thus be observed that by the mirror reflection as obtained by the inclusion of the angular reflector unit, as shown in Figure 4, a single optical illuminating system may be employed both as a projector and enlarger.

Having thus described my invention and illustrated its use, what I claim as new and desire to secure by Letters Patent, is:

1. In an optical projector illuminating system having a condenser lens assembly of spaced condenser lenses to focus the light source at one conjugate to the optical center of the objective at the second conjugate, the light beam passing between the two sections being collimated, the combination wherein said condenser assembly comprises separable condenser segments for said spaced lenses and complementary coupling means for separably holding the segments and an angular plane reflector unit having coupling means common to said segments for inter-positioning between the segments for enlargement, magnification transversely of the axis of the illuminating system such that when one half of the segments are turned at 90° to each other, and provided with the plane mirror redirecting the collimating rays, the conjugate points of the condenser system remain the same.

2. In an optical projector having a condenser assembly of a plurality of separable lenses to focus the light source at one conjugate to the optical center of the objective at the second conjugate, the light beam passing between the two sections being collimated, the combination wherein said lenses are mounted in separable spaced front and rear lens mounting segments each having coupling connectors for holding the segments for projection along the optical axis of the condensers in each segment and a plane mirror reflector unit having complementary couplings for said segments to mount said front segment with its optical axis positioned vertically such that when one half of the segments are turned at 90° to each other, and provided with the plane mirror redirecting the collimating rays, the conjugate points of the condenser system remain the same.

3. In an optical projector having a condenser assembly of a plurality of spaced separable lenses to focus the light source at one conjugate to the optical center of the objective at the second conjugate, the light beam passing between the two sections being collimated, the combination wherein each of said lenses is mounted in readily separable square spaced from and rear segments hinged to each other, each segment having coupling connectors for projection along the optical axis of the condensers in each segment and a readily separable plane reflector unit having complementary couplings for said segments to mount said front segment with its optical axis positioned vertically such that when one half of the segments are turned at 90° to each other, and provided with the plane mirror redirecting the collimating rays, the conjugate points of the condenser system remain the same.

4. In an optical system having a light-tight projector casing with means for vertically supporting a light source normal to the optical axis, a condenser having a front lens mounting segment and rear lens mounting segment coupled to each other in alignment for projection substantially in a horizontal direction by quickly separable connectors to focus the light source at one conjugate to the optical center of the objective at the second conjugate, the light beam passing between the two sections being collimated, and hinge means for swinging the front lens mounting segment transverse to the optical axis, and an angular deflecting reflector unit having light-tight coupling at opposed ends complementary to said segments for projection in a vertical axis upon the stage of an objective for conversion of the projector to a photographic enlarger such that when one half of the segments are turned at 90° to each other, and provided with the plane mirror redirecting the collimating rays, the conjugate points of the condenser system remain the same.

5. In an illuminating system comprising a casing having an optical projector including a socket for vertically supporting an illuminant and a reflector therefor within a light-locked casing, having ventilating apertures, a condenser system comprising a front lens mounting segment and a rear lens mounting segment hinged to each other and including a light-tight coupling for projecting a beam along the optical axis of the illuminant to focus the light source at one conjugate to the optical center of the objective at the second conjugate, the light beam passing between the two sections being collimated, the combination therewith of a reflector unit comprising a casing having complementary couplings for said segments arranged substantially at right angles to each other and an angularly disposed plane mirror in said casing for vertically projecting the beam for enlargement at right angles to the optical axis of the illuminating system such that when one half of the segments are turned at 90° to each other, and provided with the plane mirror redirecting the collimating rays, the conjugate points of the condenser system remain the same.

6. An optical projector and enlarging illuminating system having a split condenser lens assembly constituting spaced rear and front lenses to focus the light source at one conjugate to the optical center of the objective at the second conjugate, the light beam passing between the two sections being collimated, separate condenser mounting segments comprising lens mounts in which each of the rear and front lenses respectively is carried, each of said segments having complementary quickly separable coupling means holding the segments normally to a single rectilinear optical axis common to all of the condenser lenses, and an angular plane reflector unit having mounting means to each side thereof including coupling means respectively common to said first coupling means for separable interpositioning of the unit between the segments for enlargement magnification transversely of the axis of the illuminating system without substantial adjustment of the illuminating assembly such that when the condenser segments are turned at right angles to each other, with the plane reflector therebetween to redirect the collimating rays, the conjugate points of the condenser system remain the same.

ALFRED EVERS.

REFERENCES CITED

The following references are of record in the file of this patent:

UNITED STATES PATENTS

| Number | Name | Date |
| --- | --- | --- |
| 1,153,163 | Jenkins | Sept. 7, 1915 |
| 1,262,180 | Davies | Apr. 9, 1918 |
| 1,590,254 | Randall | June 29, 1926 |
| 1,794,147 | Chidester | Feb. 24, 1931 |
| 1,919,922 | Baker et al. | July 25, 1933 |
| 1,944,025 | Foster | Jan. 16, 1934 |
| 1,945,522 | Eitzen | Feb. 6, 1934 |
| 2,028,505 | Eitzen | Jan. 21, 1936 |
| 2,050,317 | Hanks | Aug. 11, 1936 |
| 2,108,054 | Eitzen | Feb. 15, 1938 |
| 2,501,469 | Kouzminsky | Mar. 21, 1950 |

FOREIGN PATENTS

| Number | Country | Date |
| --- | --- | --- |
| 382,193 | Germany | Sept. 29, 1923 |